United States Patent [19]

Mayr-Fröhlich et al.

[11] Patent Number: 5,075,859
[45] Date of Patent: Dec. 24, 1991

[54] ANTI-LOCKING BRAKING SYSTEM WITH LIMITED YAWING MOMENT

[75] Inventors: Mathias Mayr-Fröhlich, Munich; Alfred Utzt, Fürstenfeldbruck, both of Fed. Rep. of Germany

[73] Assignee: Knorr-Bremse AG, Munich, Fed. Rep. of Germany

[21] Appl. No.: 476,325

[22] Filed: Feb. 7, 1990

[30] Foreign Application Priority Data

Feb. 7, 1989 [DE] Fed. Rep. of Germany ....... 3903585

[51] Int. Cl.$^5$ .............................................. G06F 15/48
[52] U.S. Cl. ............................ 364/426.02; 364/426.01
[58] Field of Search ...................... 364/426.02, 426.01, 364/558; 303/98, 100, 103

[56] References Cited

U.S. PATENT DOCUMENTS

| 4,805,105 | 2/1989 | Weiss et al. | 364/426.02 |
| 4,902,076 | 2/1990 | Ushijima et al. | 364/426.02 |
| 4,925,254 | 5/1990 | Holst et al. | 364/426.02 |

Primary Examiner—Salvatore Cangialosi
Attorney, Agent, or Firm—Pollock, Vande Sande & Priddy

[57] ABSTRACT

In the anti-locking braking system with limiting yawing moment, a first functions generator (1) interrogates the settings of the monitored valves and, from the derivative trends over time of the valve settings and in accordance with a predetermined function derives a signal which represents the brake pressure in the monitored wheel brake cylinders.

8 Claims, 2 Drawing Sheets

ANTI-LOCKING BRAKING SYSTEM WITH LIMITED YAWING MOMENT

FIELD OF THE INVENTION

The invention relates to an anti-locking braking system with limited yawing moment.

BACKGROUND OF THE INVENTION

If a vehicle is braking with active anti-locking mechanisms under differing traction conditions for the left and right vehicle wheels, where an individual anti-locking mechanism is provided for each wheel, a differential brake pressure level between the vehicle wheels with "good" traction and the vehicle wheels with "poor" traction. This brake pressure differential produces a yawing moment which can lead to a loss of control of the vehicle. This yawing moment can be avoided completely only by applying the so-called "select-low-method" to identify the brake pressure of that wheel that has the least traction as the command variable for control of the other wheels. In this manner, however, the braking distance would be increased, since only the areas with the poorer traction would be engaged, while the possible braking power of the wheels with the better traction would be "wasted"

Thus, in practice, brake pressures producing yawing moment have been permitted, but the possible differentials in brake pressure between the left and right front wheels have been limited to a predetermined value.

Limiting the pressure differentials presupposes, that the pressures actually prevailing in the brake cylinders are known. It is known, for example, that the brake cylinders of the right and left front wheels can be connected by a brake line in which a prestressed spring relief valve is inserted. When the difference between the two pressures exceeds the (sic) determined by the prestress limit of the spring, the relief valve opens so that the higher pressure is vented. This, solution, however is mechanically expensive.

It would also theoretically be possible to measure the respective brake pressures through the use of electromechanical pressure voltage transformers and then to adjust the permissible differential pressure through electronic means. But such a solution is also expensive because of the requisite measuring equipment. Moreover, such measuring equipment is susceptible to frequent breakdowns.

SUMMARY OF THE INVENTION

The purpose of the invention is therefore to create a dependable and workable anti-locking braking system, without using additional mechanical parts, and with limited yawing moment.

The basic thrust of the invention lies in producing a reference magnitude for the actual brake pressures in the individual wheel brake cylinders through purely electronic means, by use of a logic circuit means which produces a signal representative of the actual brake pressures based on valve settings and their derivative trends over time. Depending on whether the valves are set for "ventilation", "pressure increase", "pressure holding", "venting" or "pressure decrease", this reference magnitude will be followed up in accordance with a non-linear function. Preferably this nonlinear function is an e-function:

$$P = P_{max} \cdot e^{-at}$$

at for the pressure decrease $$P = P_{max}(1 - e^{-at})$$

for the pressure increase
wherein $P_{max}$ is the maximum possible pressure as determined by the pressure means of the supply source, e is the Euler Number (1.7182818284), t is time and a is a parameter of the e-function, determined by ancillary conditions of the braking system, e.g., cross-sectional areas the brake lines, volumes of the lines and brake cylinders, valve cross-sectional areas, etc.

When a measurement of the brake pressure the two front wheels is determined in this manner, the difference between these pressures represents a measurement of the existing yawing moment. Since only this differential will be considered for limitation of the yawing moment, the pressures so derived need not necessarily be identical with the actual brake cylinder pressures.

The limitation of the yawing moment has an impact on the wheel which has the good traction. The wheel with the "bad" traction, on the other hand is controlled only by the anti-locking function. Therefore, according to another feature of the invention, a selection circuit determines which of the monitored wheels has the higher, and which has the lower brake pressure, the wheel with the lower pressure being the wheel with the "bad" traction. Limiting of the yawing moment controls the brake cylinder pressure of the wheel with good traction in accordance with a function, which produces the trend over time of the differential in the brake cylinder pressures. According to an embodiment of the invention this function is a slope function increasing over time and terminating at a maximum value. This slope function begins at the first anti-locking tripping with the value "0" and then increases in order to give the driver time to react. The maximum possible differential pressure and hence the maximum possible yawing moment, is reached after a strictly predetermined time interval. When the anti-locking function is inoperative, the yawing moment limitation is of course also turned off.

Additionally, in producing the slope function, growth or incremental change in the permissible differential value occurs only when the maximum permissible differential pressure has not yet been reached, and when the yawing moment limiting function was active in the preceding time cycle.

The slope function is applied in an automatic control system as a desired value for the permissible differential pressure. The differential value for the fictitious pressures stemming for the first logic circuit means represents the actual value. A deviation is then formed from the difference between these two magnitudes. In order to obviate excessive valve changes, a tolerance range is prescribed within which the deviation can move without change in the valve setting.

If the difference between the traction of the left and right front wheels is relatively small and if the wheel with the better traction is controlled in accordance with the described slope function, it may happen that this wheel locks, since the brake pressure on this wheel derived from the yawing moment limitation can become greater than the pressure derived from the antilocking function for this wheel. In order to avoid such locking, each of the valve settings derived from the yawing moment limitation is compared with the desired "valve setting" of the anti-locking control for this wheel. As a result of this comparison, it is determined that the yawing moment limitation can influence the valve setting demand of the anti-locking function only for the purpose of reducing the brake pressure. If the anti-locking function results in a command for a reduction of pressure, such command will be relayed to the valves. On the other hand, if the anti-locking function commands a maintenance of pressure, while the yawing moment limitation function commands an increase in pressure, then the anti-locking function also takes precedence.

BRIEF DESCRIPTION OF THE DRAWINGS

In the following text an embodiment of the invention, will now be described with reference to the accompanying drawings, in which.

DESCRIPTION OF PREFERRED EMBODIMENT

Figure 1:
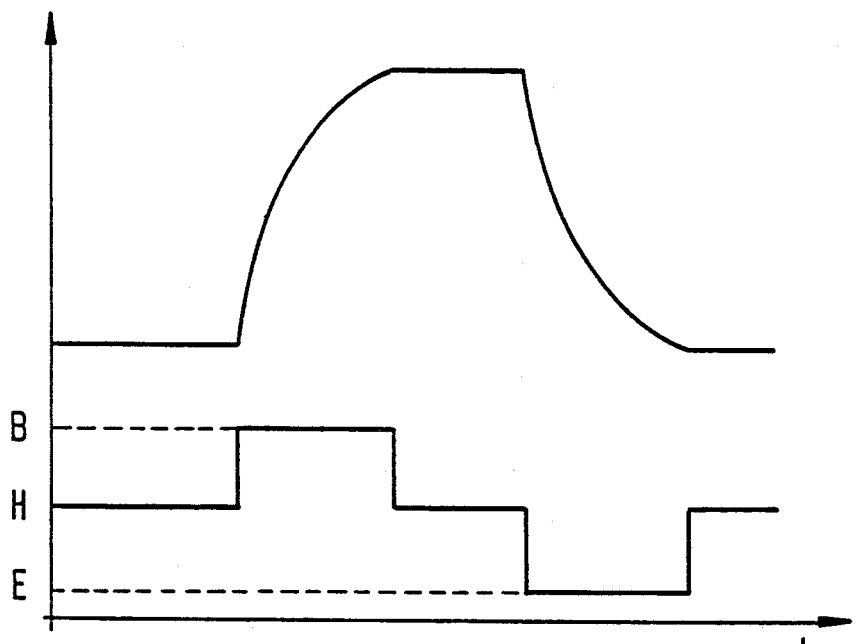
FIG. 1 is a graph showing an example of the derivative trend over time of the estimated braking pressure dependant on valve settings.

FIG. 1 illustrates how, with the duration of possible valve settings a physical value is determined which closely represents the actually existing brake pressures in the respective brake cylinders. The possible valve setting positions "ventilate", "hold" and "vent" are designated with the letters "E", "H". and "B". Each is allocated a logical level or numerical value, as follows: E=0, H=1, and B=2. As long as the valve is held in the "hold pressure" setting, the brake pressure remains constant. If the valve is in "ventilate" position, pressure in the associated brake cylinder increases in accordance with a nonlinear function, which is mathematically an e-function ($P_{max}$* $e^{-at}$), the parameters of this e-function being ascertainable on the basis of configuration of the braking system, e.g., the cross sectional areas of the lines and valves, volumes of the brake cylinders, etc. When these parameters and the pressure of the compressed air source feeding the system are known it is possible to determine from the time period during which the valve is open, the pressure change occurring during such time period. The same is true for the venting function, in which the pressure in the brake cylinder drops in accordance with an e-function.

In this manner, it is thus possible, on the basis of the duration of the various valve settings (venting, holding, and pressurization) to determine very precisely the course of brake pressures without directly measuring the pressure itself. The brake pressure so derived is designated the "fictitious braking pressure" and is used as the actual pressure for control purposes.

The differential between the fictitious brake pressures of the front wheels provides a measure for the existing yawing moment. Since only this differential is considered in limiting of the yawing moment, the fictitious pressures need not necessarily coincide with the precise actual brake cylinder pressures. The limitation of the yawing moment impacts the wheel which has "good" traction, but not the wheel with "poor" traction. The latter is rather impacted by an individual control corresponding to the output of the anti-locking portion of the braking system.

Figure 2:
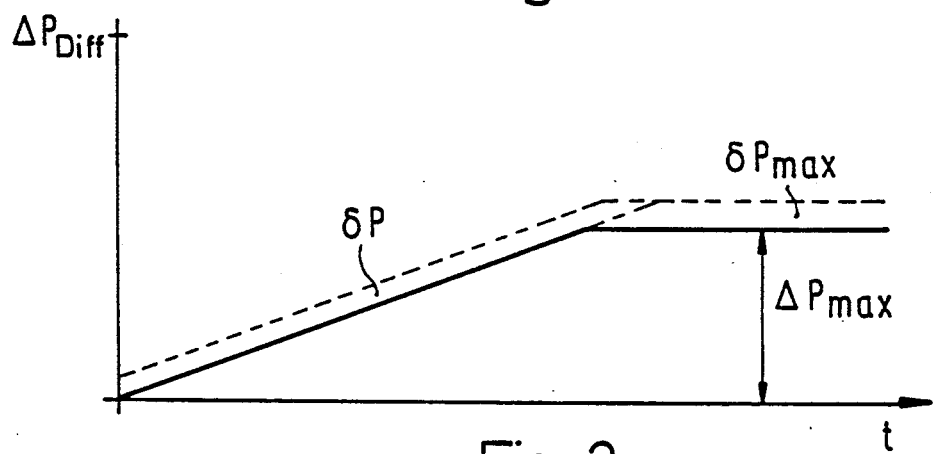
FIG. 2 is a graph showing the derivative trend over time of the permissible differential pressure between the right and left vehicle wheels.

FIG. 2 shows the derivative trend over time of the permissible differential between the fictitious pressures of the front wheels permitted by the control. A slope function ending in a maximum value of $\delta P_{max}$ has proven effective, other approaches are also conceivable. At the start of an anti-locking control, the permissible differential of the fictitious pressures is set at "0", in order that the driver not feel a "shock" on the steering mechanism.

Figure 3:
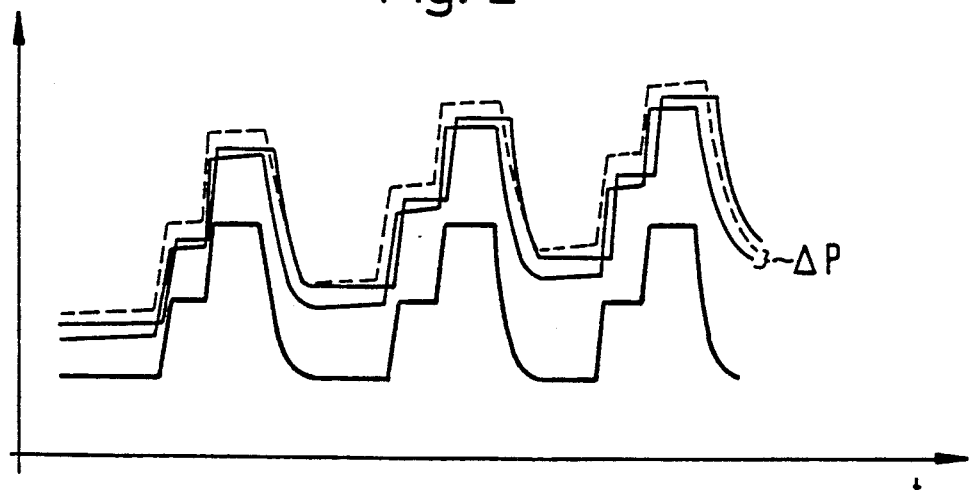
FIG. 3 is a graph showing the derivative trend over time of the braking pressures of two wheels during an anti-locking braking action with operable yawing moment limitation.

This permissible differential rises linearly in the slope function in FIG. 2, the degree of incline of the "slope function" being so selected that the driver has sufficient time to counter steer. The slope function ends in a limit value, which describes the maximum permissible differential between the fictitious pressures in the front wheels. The function has its zero time point at the beginning of the anti-locking braking system (ABS) function. In accordance with the formula $P_{good}=P_{bad}+\delta P$ the momentary desired value of pressure of the wheel with "good" traction is calculated. The valve setting to be commanded is calculated by comparison with the fictitious pressure of this wheel. In order to avoid continuous ventilating and venting, a tolerance range is defined, which is depicted dotted lines in FIG. 2. The following control relationships are derived therefrom, and are also shown in FIG. 3:

Case 1:
$P_{good\ real} > P_{good\ ficticious}$ + tolerance range => ventilate

Case 2:
$P_{good\ real} < P_{good\ ficticious}$ + tolerance range and $P_{good\ ideal} > P_{good\ ficticious}$ => hold Case 3:
$P_{good\ real} < P_{good\ ficticious}$ => vent FIG. 3 shows that the permissible pressure differential between the wheel with poor traction and the wheel with good traction increases slowly.

If the traction values for the left and right wheels are relatively close to each other and the wheel which has good traction is controlled only in accordance with the yawing moment limiting function which relates the brake pressure for the wheel with good traction to the wheel with bad traction, the brake pressure on the wheel with good traction could become great enough to cause locking of the wheel with good traction. To avoid this, each valve setting which produces the yawing moment is compared with the steering commands of the anti-locking mechanism, those commands stemming from the anti-locking function which prevent a further rise in pressure, i.e., the commands "hold", and "vent" having precedence over the commands for yawing moment limitation.

Figure 4:
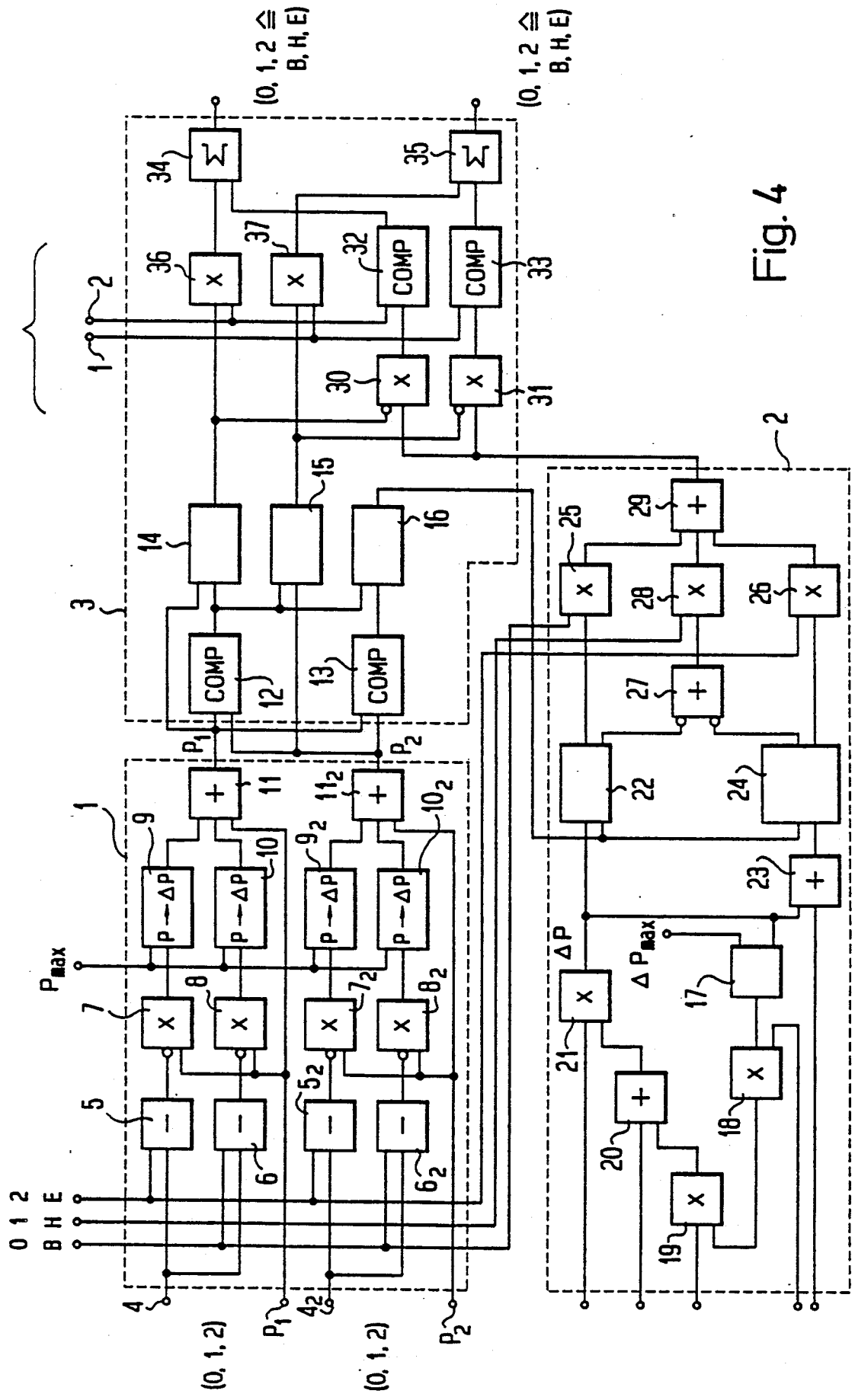
FIG. 4 is a block switching diagram of an embodiment of the structural components of the anti-locking braking system applied for the yawing moment limitation.

FIG. 4 shows a block switching diagram for the components used in yawing moment limitation. Block 1 therein has the function to produce signals from the valve settings for the fictitious pressures of the monitored wheels. Block (2) produces the "slope function" or the function for the permissible pressure differentials. Block 3 determines which of the two wheels has the higher and which has the lower pressure and determines from this monitoring function, and the monitoring of the commands from of subtracter 6 has a value of "1", only when valve 1 is set for venting (value "0"). Both the inverted output signals of subtracters 5 and 6 are fed to gate circuits 7 or 8, which then open and accept a signal at their other gate, only when the "gate steering signal" has a value of "1". These gate circuits 7 and 8 are depicted here as multipliers. The value of the fictitious pressure Pl at valve 1, which was determined in the preceding time cycle, are fed to the other entrances of gate circuits 7 and 8. If valve 1 is set for "venting", then this value $P_1$ is fed as the initial value to logic circuit means 9, which determines from this initial value the descending branch of the e-function (FIG. 1) and which on its output side produces the value $\delta P$, which is a measurement of the change in pressure for the pressure reduction in the last time cycle. Analogously, the output signal of gate circuit 8 is fed to logic circuit means 10, which determines the corresponding pressure change for increasing pressures. At the end of a time cycle, at most one of the two logic circuit means 9 or 10 can carry an output signal with a value other than "0". This output signal is fed to adder 11, in which each value which each value $\delta P$, with the right identifier, is added to the value $P_1$ of the preceding time cycle. Thereby on the output side of adder 11 there is a signal which corresponds to the fictitious pressure of valve 1. If valve 1 is set for "hold pressure", then the output signals of both gate circuits 7 and 8 are at "0", so that the logic circuit means 9 and 10 are inoperative, and the pressure $P_1$ from the preceding time cycle is taken over as a new pressure for the current time cycle. Both logic circuit means 9 and 10 are also provided with a fixed value for the known maximum pressure $P^m{}_{max}$ of the compressed air source feeding the system.

The fictitious pressure $P_2$ for the second valve is determined, in the same way, the corresponding parts being identified by the same references, however, in index 2. The values of the two fictitious pressures $P_1$ and $P_2$ are, one the one hand, temporarily stored in a buffer stores (not shown) and fed to the inputs for the fictitious pressure values of the preceding time cycle. Further, they are fed to the inputs of Block 3.

In Block 3 it is first determined, which of the two wheels has the higher and which the lower fictitious pressure. For this purpose, the two fictitious pressures $P_1$ and $P_2$ are fed to a maximum value switching network 12 and a minimum value switching network 13. The maximum value switching network produces as output the value of the larger of its two input signals, i.e., corresponding to the higher pressure $P_{high}$ of the two pressures $P_1$ and $P_2$. Correspondingly the minimum value switching network 13 produces as output the lower value of its two input signals, i.e., the value of the lower pressure $P_{low}$. Subtracters 14 and 15 determine which of the two wheels carries the higher pressure. To do this, the differentials $P_{high}$ minus $P_1$ and $P_{high}$ minus $P_2$ are derived and the sign (plus or minus) of the differentials determined. If wheel 1 has the lower pressure, the output of subtracter 14 is thus the value "1", and if this wheel has the higher pressure the output value is "0", that wheel has the higher pressure. Correspondingly, subtracter 2 has the output value of "1" if wheel 2 has the lower pressure and the value "0", if wheel 2 has the higher pressure.

In a further subtracter 16 the differential value $P_{is}$ of both pressures $P_1$ and $P_2$ or $P_{high}$ and $P_{low}$ are determined. This differential value is transmitted to Block 2.

Block 2 determines the function of derivative trends over time of the pressure differentials admitted for limiting the yawing moment. FIG. 4 shows the model with the slope function in accordance with FIG. 2. This slope function $\delta P_{real}$ can increase when the following conditions are met:

1. The anti-locking feature must have been actuated;
2. The yawing moment limitation must have been engaged in the preceding time cycle;
3. The maximum permissible pressure differential $\delta P_{max}$ must not yet have been reached.

In the block switching diagram in FIG. 4 these functions are achieved as follows: By means of a comparator 17 it is determined, whether the maximum pressure differential $\delta P_{max}$ is still larger than the current pressure differential value $\delta P_{real}$. If this is the case, then the value "1" is produced which opens the gate circuit 18, which is also shown here as a multiplier. This gate circuit then lets through an incremental value $\delta P$, by which the slope function is to increase in the succeeding time cycle. This value is then also let through a further gate circuit 19, when in its control entrance a signal (functional symbol "1") is present which indicates that the yawing moment limiting function was active in the preceding cycle. (This signal originates, as will be explained later, from comparators 32 or 33). In an adder 20, the incremental value will be added to the value $P_{real}$ from the preceding cycle, resulting in the new desired value for the pressure differential $\delta P_{real}$. This value then passes through a further gate circuit 21, if an anti-locking function has occurred.

The current value of the permissible pressure differential dPreal is compared in a comparator 22 with the fictitious pressure differential $\delta P_{is}$, the output side of comparator 22 being able to accept the values "0" and "1". If the differential $\delta P_{real}$ minus $\delta P_{is}$ is negative, then the output of comparator 22 carries the value "0"; if it is positive, then the output value is "1".

In order to avoid excessive switching of the valves, a tolerance range is superimposed on the slope function. A value determining the width of the tolerance range is added in adder 23 to the current desired value $P_{real}$, whereafter the reference symbol of the differential $\delta P_{is} = (\delta P_{real} + TOL)$ is determined, in a comparator 24 whose construction corresponds to that of comparator 22, the value TOL being the value for the width of the tolerance range. If this differential is negative, the output signal of comparator 24 is "0"; if it is positive, the output value of comparator 24 is "1".

In the switching downstream of comparators 22 and 2 it is determined which valve setting is required for the yawing moment limitation. For this function three multipliers 25, 26, and 28 are shown, the illustration was chosen merely to improve comprehension; in practice, multiplier 25 can be omitted. The input value fed to multiplier 25 is a fixed value of "0", so that its output, independently of the output of comparator 22, always carries a "0" for the command "ventilate".

As its one input, the multiplier 26 has the fixed value 2 (for venting), so that at its output a "0" or a "2" can appear, depending o the value of the output of comparator 24.

The output signals of comparators 22 and 24 are further inverted and then connected in an AND-gate 27. The output signal of this AND-gate is a "1" when the fictitious pressure differential $P_{is}$ is within the tolerance range. If it is outside the tolerance range, the output of the AND-gate is a "0". The output of AND-gate 27 is multiplied with the fixed value "1" in multiplier 28, so that the output of multiplier 28 can carry either a "0" or a "1". The three outputs of multipliers 25, 26, and 28 are fed to a maximum value switching network 29, which selects the largest of its three input values, and has that one as output. In the selected ranking of the values "0", "1", and "2", this means that the command "vent" has precedence over the commands "hold" and "ventilate", and that the command "hold" has precedence over "ventilate".

The command stemming from the slope function (Block 2) for the valve setting is then fed to Block 3, where the command is relayed to the valve which carries the higher pressure $P_{high}$ To this end, the output of the maximum value switching network 29 is fed to two gate circuits 30 and 31, to whose control inputs are fed the outputs of gate circuits 14 and 15. Since the control inputs of gate circuits 30 and 31 are inverted, gate circuit 30 lets through the valve setting command signal stemming from the slope function to valve 1, when wheel 1 has the higher pressure of the two front wheels. Correspondingly, gate circuit 31 lets the command signal through to valve 2, when that one has the higher pressure of the two.

In order to prevent, blocking of the wheel with the best traction through the slope function of the yawing moment limitation, the command signals stemming from the gate circuits 30 and 31 for the valve settings are compared in comparators 32 and 33 along with the command signals for valve settings stemming from the antilocking control. In principle these comparators, here again are maximum value switching networks, which produce the maximum values of both their input signals as outputs. For instance if the anti-locking function commands venting (value 2), while the yawing moment limiting function commands a hold or ventilation (values 1 or 0), then the venting always has precedence. The same is true for the anti-locking command "hold" in relation to the yawing moment limiting command "ventilate".

The output signals of comparators 32 and 33 are fed to the adders 34 or 35, whose output signals control the valves for wheel 1 or wheel 2. The other inputs for adders 34 or 35 receive output signals from gate circuits 36 or 37, which are controlled by output signals from comparators 14 or 15. The wheel whose brake cylinder has the lower pressure opens one of the two gate circuits 36 or 37, so that the command signal for the valve setting stemming from the anti-locking automatic control system is let through to the associated adder 34 or 35. This also assures that the wheel with the worse traction, which has the lower brake cylinder pressure, is controlled by the anti-locking function, while the other wheel is controlled by the limiting yawing moment with the proviso, that also for this wheel the anti-locking function has precedence under certain operating conditions, which are determined by comparators 32 and 33.

What we claim is:

1. Vehicle anti-locking braking system with limited yawing moment, in which a difference in brake pressure in wheel brake cylinders of left and right front wheels of a vehicle is limited to a predetermined maximum value ($P_{max}$), said system comprising a first logic circuit means (1) adapted to receive an input signal (0, 1, 2) which represents the position of the valves controlling the monitored wheel brake cylinders, wherein said first logic circuit means (1) produces an output signal ($P_1'P_2$) representing said brake pressure in the respective wheel brake cylinders, said output signal being dependent from a value and a duration of said input signal and from a predetermined function.

2. Anti-locking braking system according to claim 1, wherein the said predetermined function of said first logic circuit means (1) is an e- function.

3. Anti-locking braking system according to claims 1 or 2, wherein the output signals of said first logic circuit means (1) are transmitted to a selection circuit (3) that determines which of the monitored wheels is provided with the lower ($P_{low}$) brake pressure, and which determines a differential value ($P_{is}$) between these higher and lower brake pressures, said differential value ($P_{is}$) being transmitted to a second logic circuit means (2), which, in accordance with a further predetermined function, determines a value of a permissible differential of the braking pressures in the wheel brake cylinders, whereby said selection circuit (3) transmits an output signal of said second logic circuit means (2) only to the valve of the wheel which has the higher of the two braking pressures.

4. Anti-locking brake system according to claim 3, wherein said second logic circuit means (2) produces a signal ($\delta P_{real}$) which represents a predetermined value for the permissible differential of the braking pressures, said predetermined function of said second logic circuit means (2) being a slope function increasing in time increments and ending in a constant maximum value ($\delta P_{max}$).

5. Anti-locking braking system according to claim 4, wherein said second logic circuit means (2) comprises mechanisms which engage said second logic circuit means (2) only when the anti-locking function of said braking system is active.

6. Anti-locking braking system according to claim 5, wherein said slope function of said second logic circuit means begins with an "0" value, and comprising means (17-20), which permit an increase in said slop function only when the maximum permissible pressure differential ($\delta P_{max}$) has not yet been reached and the yawing moment limiting function was active in preceding time cycle.

7. Anti-locking braking system according to claim 6, wherein said second logic circuit means comprises means for comparing the actual pressure differential ($\delta P_{is}$) with the permissible pressure differential ($\delta P_{real}$), and for monitoring whether an obtained comparison value lies within a predetermined tolerance range, a control signal dependent thereon is produced to the valve to be actuated through the yawing moment limiting function being produced in dependence on a result of such comparison and monitoring.

8. Anti-locking braking system according to claim 7, wherein the control signal for the valve to be actuated through the yawing moment limiting function is compared in a comparator (32, 33) with a valve control signal deriving from the anti-locking braking function, wherein, in dependence on this comparison a signal stemming from the anti-locking function for ventilation and pressure reduction always has precedence over signals deriving from the yawing moment limiting function and wherein a valve control signal deriving from the anti-locking function to maintain pressure has precedence over a signal for "ventilating" or for "increased pressure" deriving from the yawing moment limiting function.

* * * * *